United States Patent
Chang (10) Patent No.: US 7,094,336 B2
(45) Date of Patent: Aug. 22, 2006

(54) AQUARIUM DEVICE WITH ENHANCED WATER FILTRATION

(75) Inventor: Yung-Sheng Chang, Hsichih (TW)

(73) Assignee: Hi-Q Bio-Tech International Ltd., Taipei Hsien (TW)

( * ) Notice: Subject to any disclaimer, the term of this patent is extended or adjusted under 35 U.S.C. 154(b) by 99 days.

(21) Appl. No.: 10/989,357

(22) Filed: Nov. 17, 2004

(65) Prior Publication Data
US 2006/0102538 A1   May 18, 2006

(51) Int. Cl.
*A01K 63/04*   (2006.01)
*C02F 3/06*   (2006.01)

(52) U.S. Cl. ............ 210/151; 210/169; 210/181; 210/220; 210/416.2; 119/260; 119/261; 119/262

(58) Field of Classification Search ......... 210/150, 210/151, 169, 175, 181, 198.1, 220, 232, 210/416.1, 416.2; 119/259, 260, 261, 262
See application file for complete search history.

(56) References Cited

U.S. PATENT DOCUMENTS

| | | | | |
|---|---|---|---|---|
| 4,148,730 A | * | 4/1979 | Willinger | 210/169 |
| 4,272,372 A | * | 6/1981 | Fonseca | 210/169 |
| 4,481,905 A | * | 11/1984 | Fonseca | 119/261 |
| 5,174,239 A | * | 12/1992 | Sato | 119/249 |
| 5,665,227 A | * | 9/1997 | Watt | 210/169 |
| 5,967,088 A | * | 10/1999 | Lin | 119/269 |
| 6,041,738 A | * | 3/2000 | Hemauer et al. | 119/226 |
| 6,684,813 B1 | * | 2/2004 | Lemon | 119/69.5 |
| 6,966,982 B1 | * | 11/2005 | Chang | 210/150 |
| 2006/0011529 A1 | * | 1/2006 | Chang | 210/169 |

FOREIGN PATENT DOCUMENTS

DE   4328541 A1 *  4/1995
FR   2808418 A1 * 11/2001

* cited by examiner

*Primary Examiner*—Fred G. Prince
(74) *Attorney, Agent, or Firm*—Leong C. Lei (57) ABSTRACT

A desktop aquarium device with enhanced water filtration is provided. The aquarium device contains a base and a spherical tank. A filtering dish is installed inside the base. The filtering device provides a winding pathway for water to flow through. Along the pathway, biological filtering balls are placed. An air pump is also fixedly installed inside the base. The base is closed from the bottom by a bottom cover. The tank is locked to the base and the tank provides an aquatic environment. Inside the tank, there are a filtering device and a water outlet. Through the water filtration provided by the biological filtering balls along the water pathway inside the filtering dish, the water in the tank requires less frequent replacement, making the aquatic cultivation simpler and more convenient.

4 Claims, 7 Drawing Sheets

FIG.7 ations. As will be realized, the invention is capable of modifications in various obvious aspects, all without departing from the scope of the invention. Accordingly, the drawings and descriptions are to be regarded as illustrative in nature, and not as restrictive.

AQUARIUM DEVICE WITH ENHANCED WATER FILTRATION

BACKGROUND OF THE INVENTION (a) Technical Field of the Invention

The present invention generally relates to aquarium devices and, more particularly, to desktop aquarium devices with enhanced water filtration.

(b) Description of the Prior Art

Figure 1:
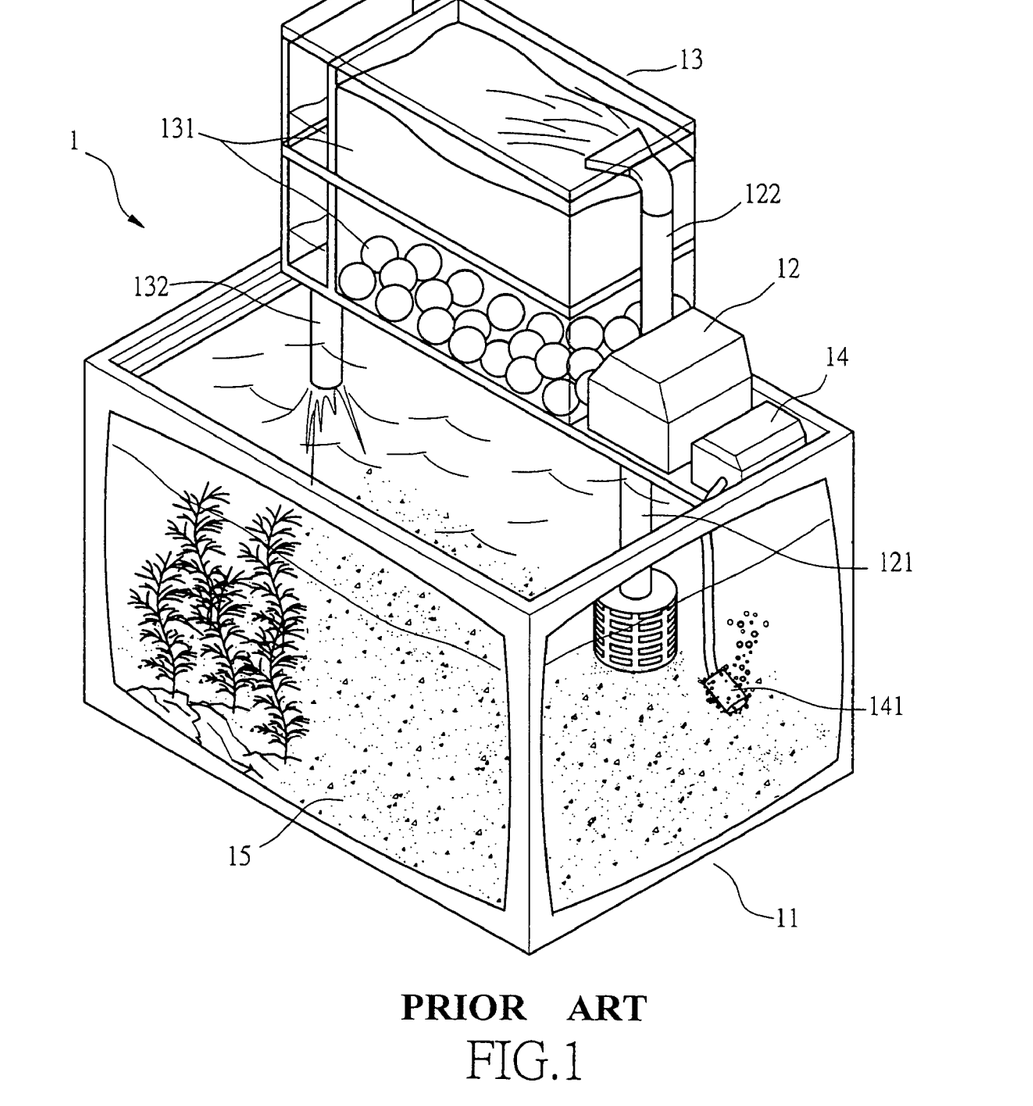
FIG. 1 is a perspective view of a conventional aquarium device.

People, as terrestrials, are constantly curious about the underwater world and aquatics. Therefore, aquatic cultivation mainly for the purpose of viewing and appreciation has rapidly grown in popularity in recent years. A conventional aquarium device 1 for observing aquatics and their activities, as shown in FIG. 1, usually contains a transparent tank 11, a water pump 12, a sump 13, and an air pump 14, all at the top of the tank 11. At the bottom of the tank 11, there are sand and stones 15 for landscaping.

To use the aquarium device 1, the sand and stones 15 are first laid at the bottom of the tank 11. The sump 13 is then installed at the top of the tank 11, and the water pump 12 is fixedly attached to the sump 13. When the foregoing components are at their places, the tank 11 is filled with an appropriate amount of water and electricity is supplied to activate the water pump 12. A water inlet 121 is extended from the bottom of the water pump 12 and into the tank 11 for a distance. When the water pump 12 is running, the water inside the tank 11 is pumped through the water inlet 121 and the water outlet 122, and into the sump 13. The sump 13 has several layers of skimmers 131 made of filtering cotton, active carbon, etc. The water pumped from the tank 11 by the water pump 12 is filtered by the skimmers 131 to remove debris such as remnants of feed and aquatic waste. The filtered water then flows back to the tank 11 via the water outlet 132 at the bottom of the sump 13. The air pump 14 at the top of the tank 11 supplies air into the water through an air outlet 141 buried in the sand and stones 15, so that the water in the tank 11 has enough dissolved oxygen for the aquatics to breathe.

The aquarium device 1, with the operation of the water pump 12 and the sump 13 to keep the water in the tank 11 clean, is able to provide an adequate environment for the aquatics. When the skimmers 131 of the sump 13 are not able to filter the water effectively, they are removed from the sump 13 and replaced with new skimmers 131. The sump 13 then recovers its filtering capability. The conventional aquarium devices have the following shortcomings.

First, the water in the tank 11 does not circulate well enough due to the limited pumping capability of the water pump 12, thereby, causing dead spaces (where water does not circulate) to develop inside the tank 11. These dead spaces would result in insufficient dissolved oxygen, which in turn would breed anaerobes, threatening the aquatics' health. When the amount of anaerobes is around 0.1 PPM, a stink that would compromise the health of the aquatics would be produced.

Secondly, the skimmers 131 in the sump 13 have a planar contact with the water. The skimmers 131 could not shatter the water to expel the stink and therefore the tank 11 requires frequent water replacement to maintain the water's cleanness. However, water replacement involves a significant amount of work. Additionally, aquatics are often hurt during the replacement process.

Accordingly, there is a need for a better aquarium device so that aquatic cultivation can be more convenient and simplified.

SUMMARY OF THE INVENTION

An objective of the present invention is to provide an aquarium device having a circular filtering base at the bottom of a spherical tank. The water in the tank flows through the filtering base in a winding water pathway inside the filtering base. Biological filtering balls are placed along the water pathway. The winding pathway increases the water circulation and filtering time and avoids the development of dead spaces inside the tank. The enhanced filtration provided by the biological filtering balls helps increasing the dissolved oxygen and maintaining the water's cleanness. The water inside the tank therefore requires less frequent replacement.

Another objective of the present invention is to provide an aquarium device to use the biological filtering balls along the filtering base's water pathway to establish point contacts with the water, to suppress the anaerobes, to help growing various probiotics, and eventually to maintain the cleanness and activeness of the water.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention.

Various changes to the described embodiments may be made in the function and arrangement of the elements described without departing from the scope of the invention as set forth in the appended claims.

Figure 2:
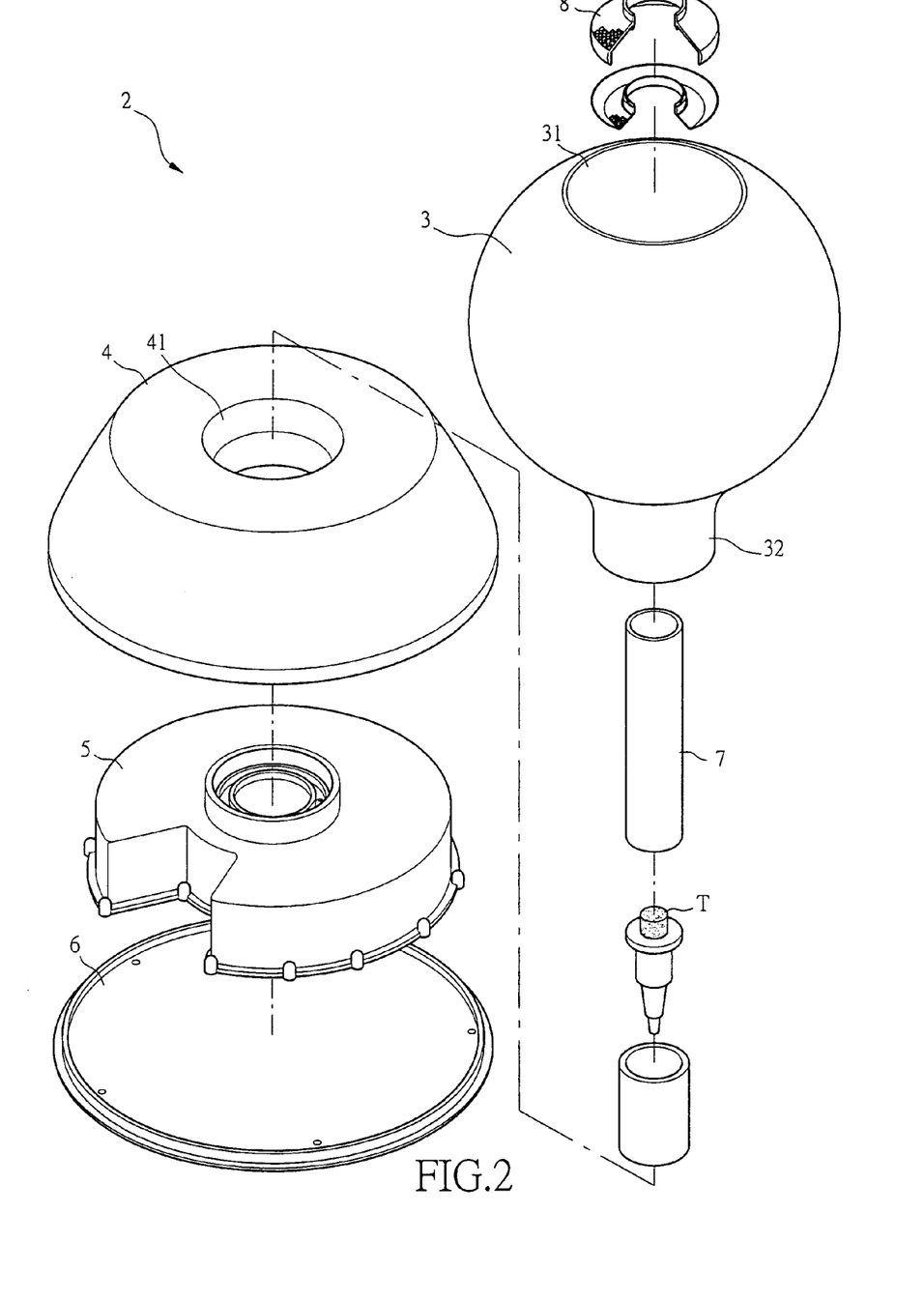
FIG. 2 is a perspective explosion view of an aquarium device according to the present invention.

Please refer to FIG. 2. As shown in FIG. 2, the aquarium device 2 according to the present invention mainly contains a tank 3, a base 4, and a filtering dish 5.

Figure 3:
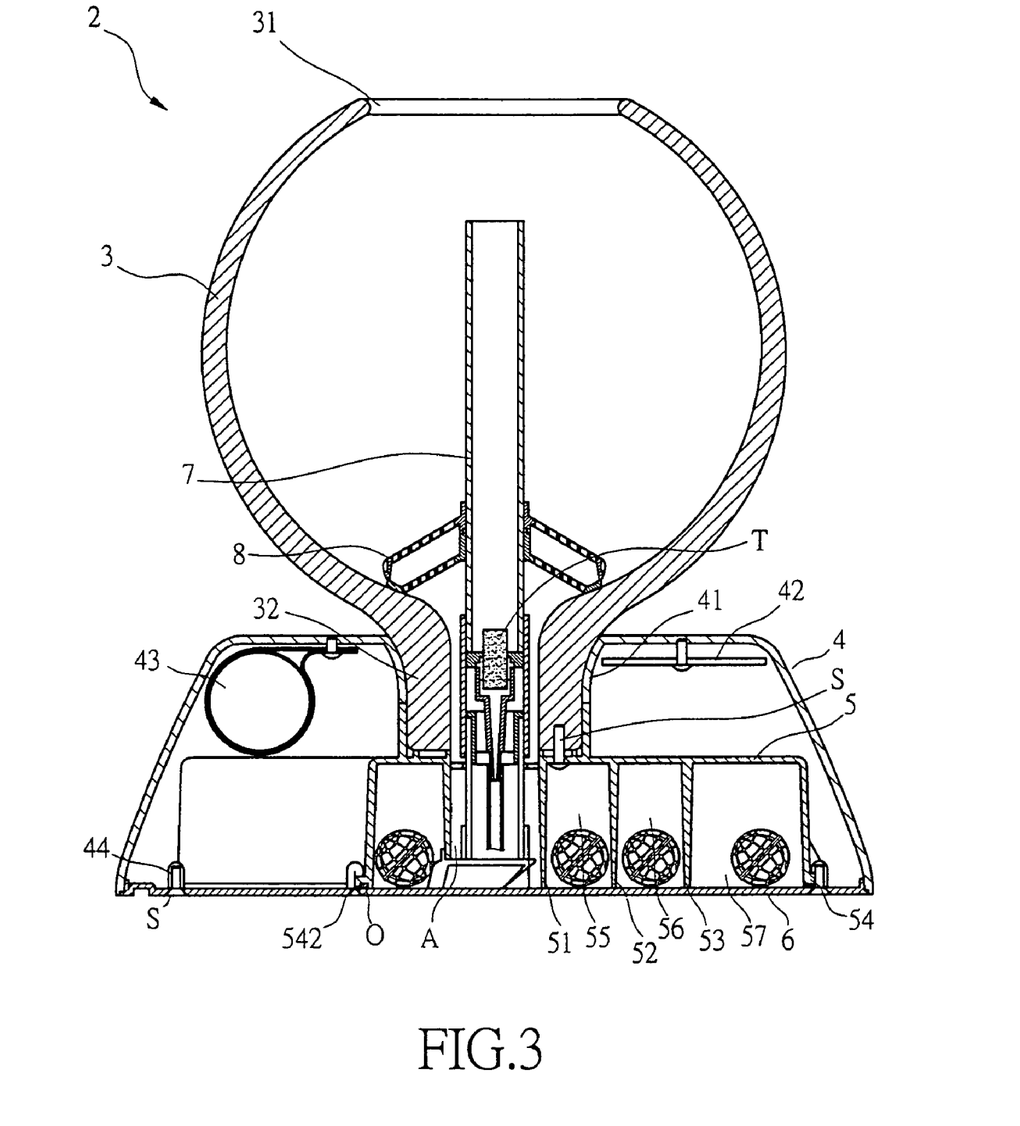
FIG. 3 is a sectional view of an aquarium device according to the present invention.

The tank 3 has a spherical shape with an opening 31 at the top and a tube 32 extended from the bottom of the tank 3. The tube 32 is extended into the base 4 to connect with the filtering dish 5. The tank 3 further contains a water outlet 7 running through the tube 32 and located at the center of the tank 3. The length of the water outlet 7 is arranged so that its upper opening is beneath the tank's opening 31 for a distance and its bottom opening is aligned with the bottom of the tube 32. Also at the bottom of the tank 3 is a ring-like filtering device 8 having a meshed surface. The water outlet 7 passes through the filtering device 8 and is positioned by the filtering device 8 in the tank 3, as shown in FIG. 3.

The base 4 is bowl-like cover having a through plug hole 41 at the center. The plug hole 41 has an identical aperture as that of the tube 32 so that the tank 3 could be plugged into the base 4. Around the plug hole 41, there is a circuit board 42 and an air pump 43 fixedly installed at the upper part of the base 4. The lower part of the base 4 has enough space to house the entire filtering dish 5. The base 4 could form a closed space by fixing a bottom cover 6 to the bottom of the base 4. The base 4 has a number of bolt columns 44 to which bolts S are fastened to fix the bottom cover 6.

Figure 4:
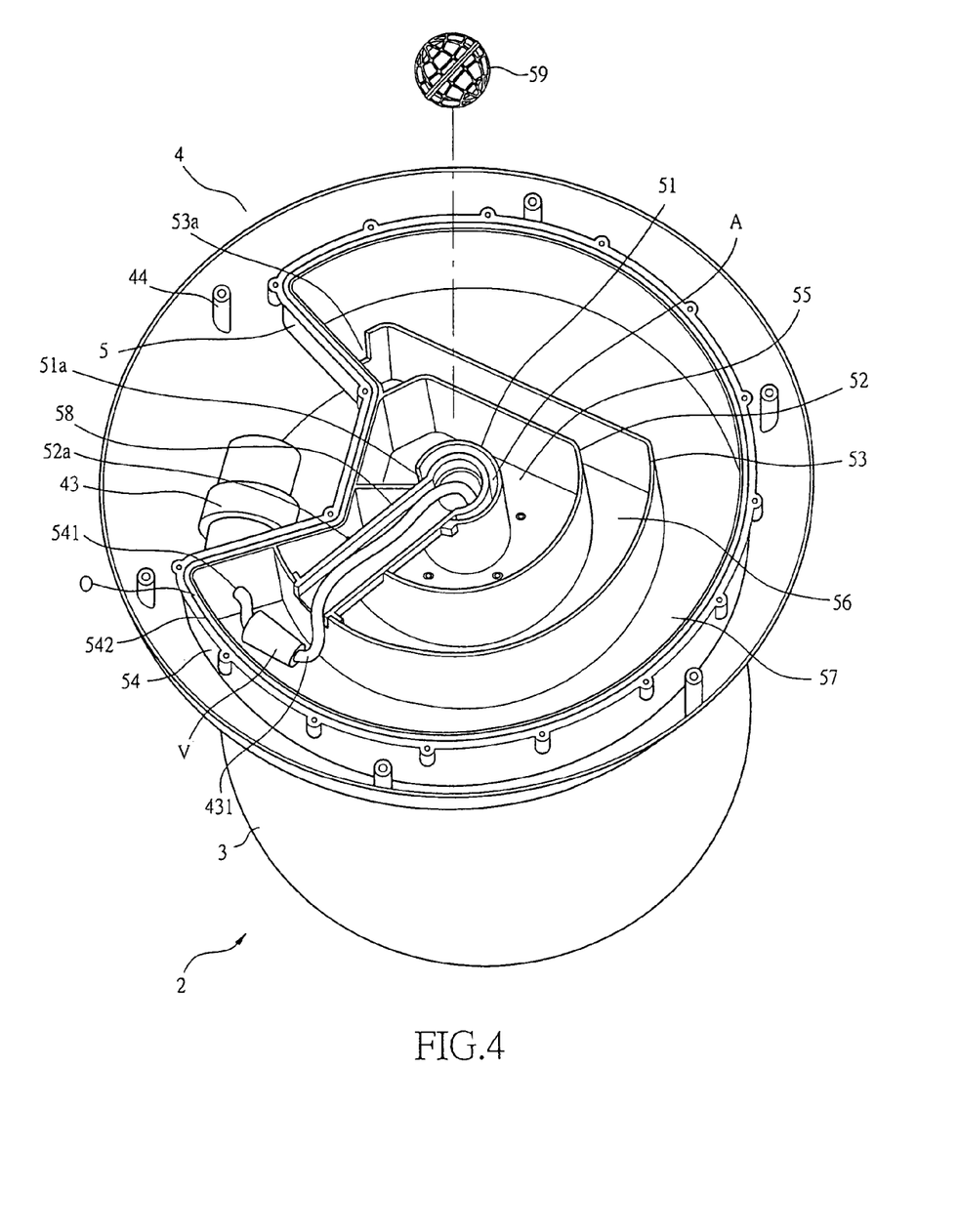
FIG. 4 is an upward perspective view of an aquarium device according to the present invention.

The filtering dish 5 mainly contains a first separation band 51, a second separation band 52, a third separation band 53, and a circumferential band 54. These separation bands jointly defines a winding water pathway consisting of a gathering water channel A, a first water channel 55, a second water channel 56, and a third water channel 57. The gathering water channel A bound by the first separation band 51 is right beneath the tube 32. On a side of the separation bands 51, 52, and 53, there are breaches 51a, 52a, and 53a, connecting the water channels together to form the winding water pathway. There is a trough 58 crosses the third and second separation bands 53, 52, and extends into the gathering water channel A and into the tube 32. Around the lower rim of the circumferential band 54, there is a leakage-proof washer O inside a groove 542. Because of the leakage-proof washer O, the filtering dish 5 becomes an air-right, closed body when the bottom cover 6 is fixed to the base 4. On a side of the circumferential band 54, there is an aperture 541 through which an air outlet 431 from the air pump 43 is extended into the third water channel 57. The air outlet 431 then passes through an one-way valve V and enters the water outlet 7. The air outlet 431 has an opening encased in a bubbler T located in the water outlet 7. Within the water channels 55, 56, and 57, there are a number of biological filtering balls 59 for filtering the water that flows through the channels, as shown in FIG. 4.

To assemble the aquarium device 2 according to the present invention, with reference to FIG. 3 again, the tube 32 of the tank 3 is first plugged into the plug hole 41 of the base 4. The tank 3 is then fixed to the filtering dish 5 using bolts S so that the tank 3 sits steadily and tightly on the base 4. Next, the bottom cover 6 is fixed to the base 4 using bolts S. The water outlet 7 and the filtering device 8 are assembled and placed into the tank 3, with the water outlet 7 passing through the tube 32.

The operations of the present invention are described as follows. When the tank 3 is filled with an appropriate amount of water, the water, due to its own gravity, flows through the filtering device 8 for a preliminary filtration. The water then flows through the tube 32 and enters into the gathering water channel A of the filtering dish 5. The water continues to flood the water channels joined by the breaches 51a, 52a, and 53a, until the entire filtering dish 5 is filled with water. When the aquarium device 2 according to the present invention is supplied with electrical power, the air pump 43 is activated to drive airs through the air outlet 431 to flow through the one-way valve V, bubbler T, and into the water outlet 7. The water in the water outlet 7 is then lifted up by the airs and overflows to the tank 3. As the water outlet 7 is filled with airs, the water in the tank 3 would have increased dissolved oxygen and thereby keep the aquatics from suffocation. The whole process is summarized as follows. The water in the tank 3 flows through the tube 32 and enters into the filtering dish 5. After the filtration by the filtering dish 5, the water then flows back into the tank 3 via the water outlet 7. The cyclic circulation and filtration provided by the present invention help making the water clean and active.

Figure 5:
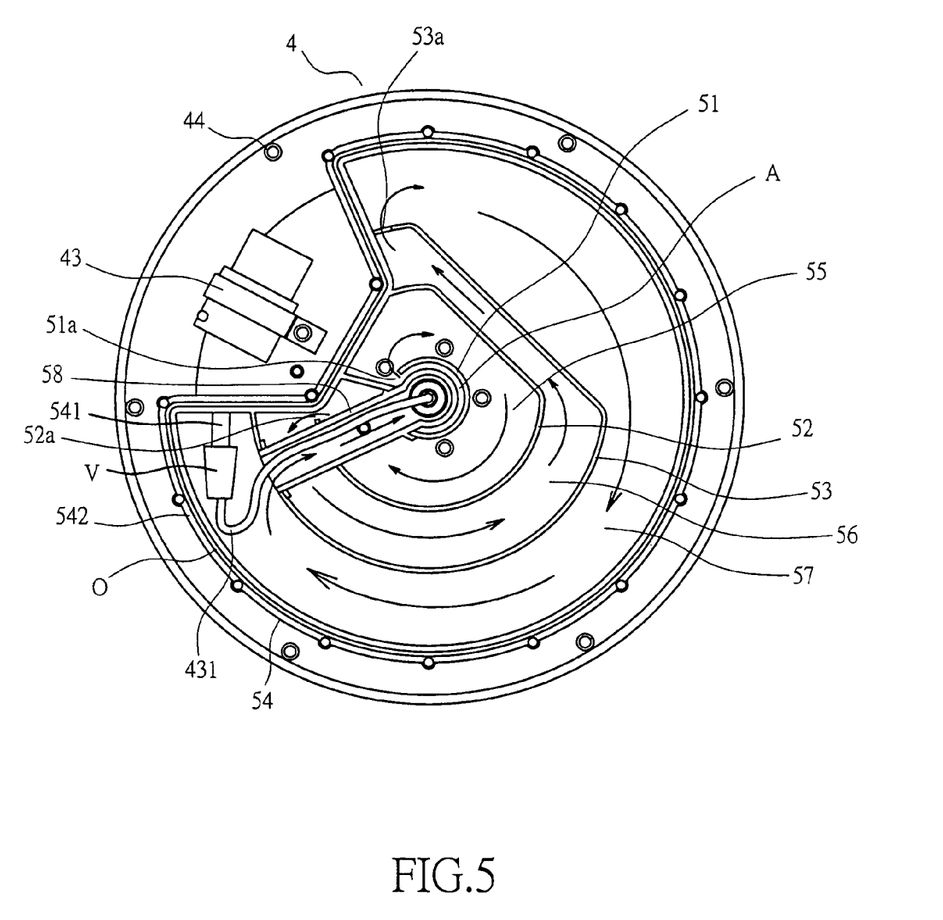
FIG. 5 is a schematic view showing the water pathway inside the filtering dish of an aquarium device according to the present invention.

As shown in FIG. 5, when the water flows into the filtering dish 5, the water passes through the gathering water channel A and enters into the first water channel 55 via the breach 51a. The water then flows into the second water channel 56 via the breach 52a, into the third water channel 57 via the breach 53a, and into the water outlet 7 via the trough 58. Along the way, the water is forced to flow through the biological filtering balls 59 for a major filtration. Through this winding pathway inside the filtering dish 5, the water undergoes an extended period of filtration for an optimum filtering effect. The biological filtering balls 59 could also shatter the water and help breeding probiotics. The water is therefore further purified, and the anaerobes are suppressed. The aquarium device 2 according to the present invention therefore requires less frequent water replacement and makes aquatic cultivation much simpler and more convenient.

Figure 6:
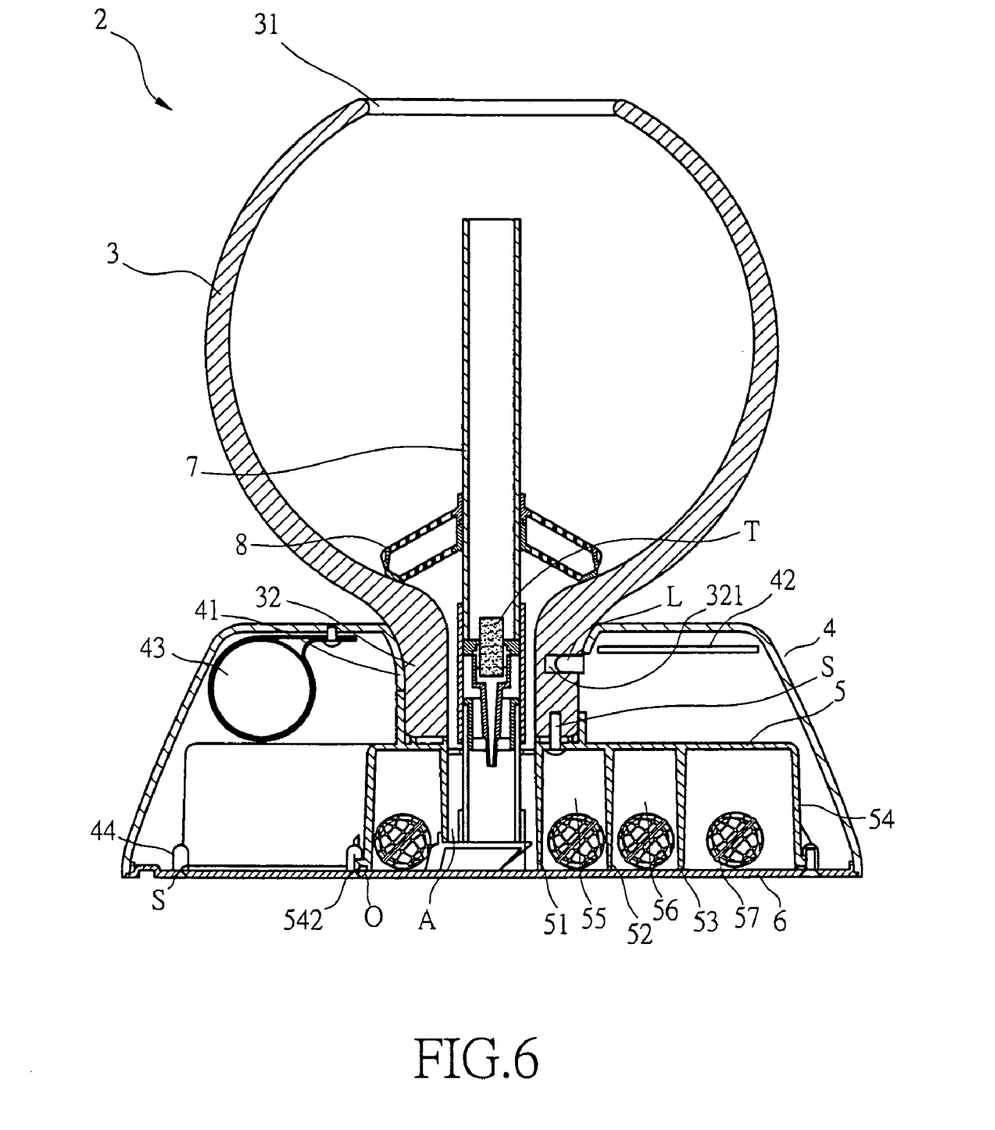
FIG. 6 is a section view of an aquarium device according to an embodiment of the present invention.

To add some additional flavor to the aquarium device 2 according to the present invention and to increase its market value, as shown in FIG. 6, the tube 32 of the tank 3 could have a pit 321 to accommodate a light-emitting diode (LED) L. The LED L is wired to and under the control of the circuit board 42 to illuminate lights of various colors and thereby generate fascinating lighting effects.

Figure 7:
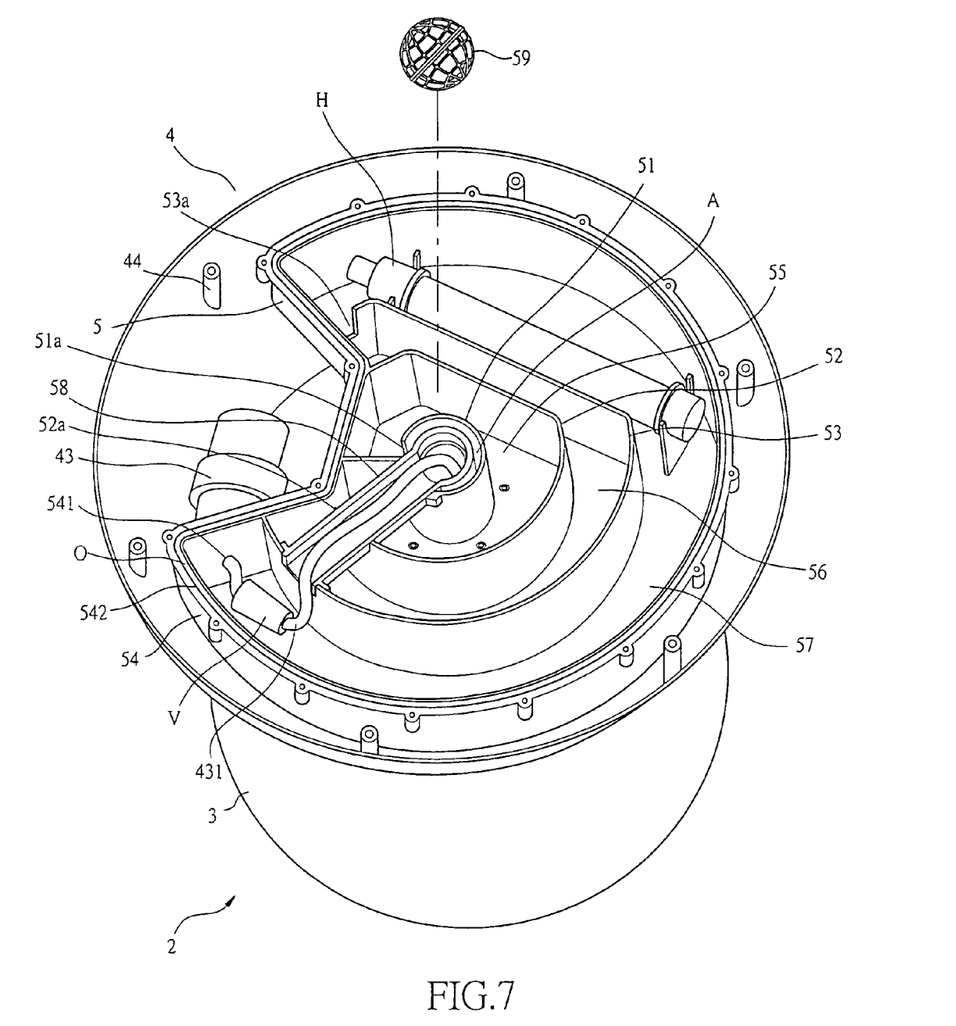
FIG. 7 is an upward perspective view of an aquarium device according to an embodiment of the present invention.

The aquarium device 2 according to the present invention could also be adapted to suit the temperature requirements of various geological regions. As shown in FIG. 7, within the third water channel 57 of the filtering dish 5, instead of having biological filtering ball 59, a heater H could be installed. The heater H is wired to and under the control of the circuit board 42 to warm up the water automatically. As such, the aquarium device 2 according to the present invention could be used in colder places.

In summary, the present invention, by installing the filtering dish 5 and the air pump 43 inside the base 4 to keep the water in the tank 3 active and to have a more stable cleanness, reduces the water replacement rate, maintains a superior environment for the aquatics, and helps making the aquatic cultivation simpler and easier.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An aquarium device comprising:

a tank having a spherical shape with an opening at said tank's top and a tube coming out from said tank's bottom, said tube being plugged into a plug hole of a base and fixedly locked with a filtering dish, said tank further having a water outlet and a filtering device inside;

a base having a plug hole at said base's center for accepting said tube of said tank, said base housing a fixedly installed air pump and circuit board within said base's upper space, and a filtering dish within said base's lower space, said base being closed from said base's bottom by a bottom cover; and a filtering dish comprising a plurality separation bands to define a winding water pathway along which a plurality of biological filtering balls are placed, wherein said tank's water undergoes cyclic circulation through said filtering dish within which said water is biologically filtered and becomes active.

2. The aquarium device according to claim 1, wherein said tube of said tank has a pit for accommodating a LED.

3. The aquarium device according to claim 1, wherein said filtering dish has a heater installed inside.

4. The aquarium device according to claim 1, wherein said air pump has an air outlet and said air outlet passes through a one-way valve and a bubbler.

\* \* \* \* \*